Sept. 8, 1931.   P. SUTER   1,822,713
PROTECTIVE DEVICE FOR MULTIPHASE MOTORS
Filed Dec. 1, 1928
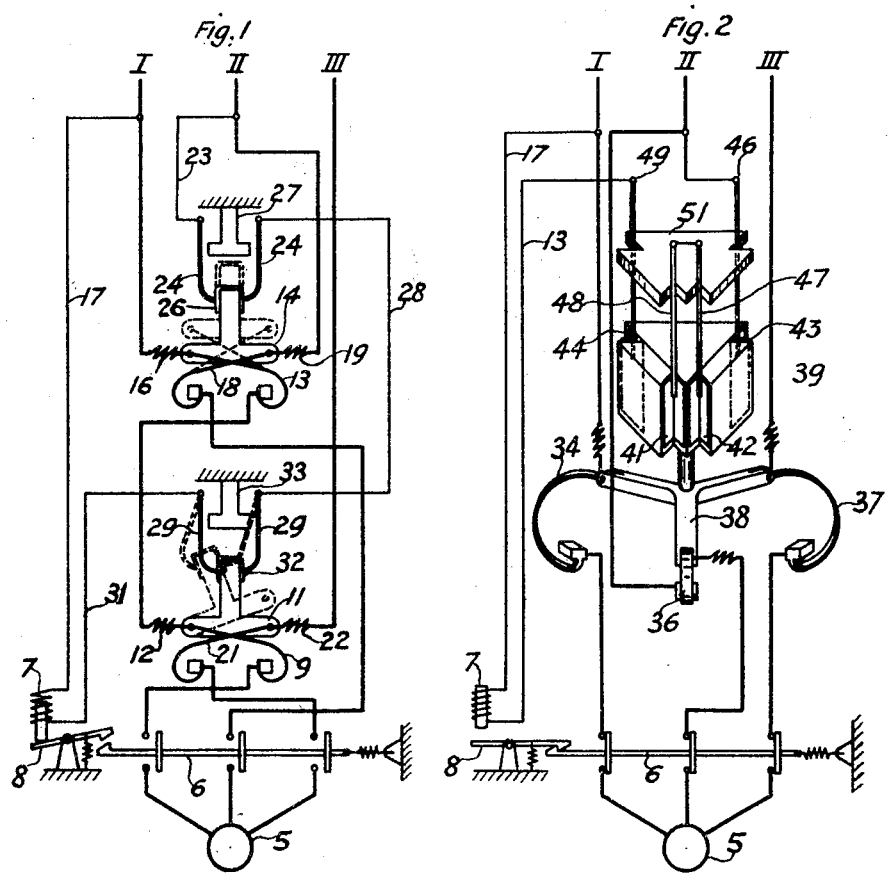
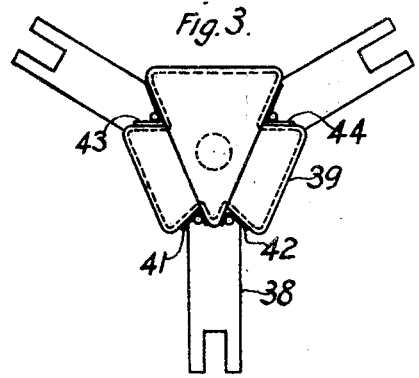
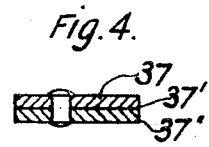
Inventor
Philipp Suter.
By Alfred H. Dyson
Attorney.

Patented Sept. 8, 1931

1,822,713

UNITED STATES PATENT OFFICE

PHILIPP SUTER, OF BADEN, SWITZERLAND, ASSIGNOR TO AKTIENGESELLSCHAFT BROWN BOVERI & CIE., OF BADEN, SWITZERLAND, A JOINT STOCK COMPANY OF SWITZERLAND

PROTECTIVE DEVICE FOR MULTIPHASE MOTORS

Application filed December 1, 1928, Serial No. 323,029, and in Germany December 2, 1927.

This invention relates to improvements in protective devices for multi-phase motors.

Electrical circuits containing multi-phase motors must be protected from failure of any phase to prevent overloading of the motor which would result in unsymmetrical conditions in the circuit. Such condition is especially undesirable in synchronous motors as will be clearly apparent.

Failure of any one phase may be made to operate the motor switch to switch the motor off by inserting double armature electro-magnets in the phase of the network. Such electro-magnet armatures are arranged to be freely movable between contacts connected in conducting relation in the relay operated motor switch circuit so that failure of one phase will allow one end of a double armature to drop thereby closing the motor switch relay circuit. Such relay must, however, be supplied with a damping or retarding device to prevent operation of the switch upon occurrence of a momentary overload or whenever the motor is connected.

The present invention, as one of its objects, proposes to avoid the above mentioned difficulty of premature opening of the motor switch.

Another object of the present invention is to provide structure which will avoid the necessity for a damping or retarding device in connection with the motor switch relay.

Other objects and advantages will be apparent from the following description in connection with the drawings wherein;

Figure 1 is a diagrammatic view of a multiphase motor protective circuit;

Fig. 2 is a view similar to that shown in Fig. 1 but illustrating a modification of the invention in elevation;

Fig. 3 is a top plan view of a portion of the structure shown in elevation in Fig. 2; and Fig. 4 is an enlarged perspective view of a portion of the invention.

Referring more particularly to Fig. 1 of the drawings, 5 indicates a polyphase motor supplied with electric current from a circuit having the phases I, II, III, which are interruptable by a motor switch 6 operable by action of a relay 7 on a latch 8 normally holding the switch 6 in closed position.

Considering the portions of line phase I, it will be seen that a switching member is connected into the line immediately behind the motor switch 6 and comprises a resilient bimetallic member or spring 9 which is joined to a substantially T shaped portion of insulation 11. The insulation 11 is connected by flexible leads 12 to a second bi-metallic spring 13 which is secured to a T shaped portion of insulation 14, similar to the insulation 11. The member 16 is a flexible connection similar to the lead 12, which are for the purpose of permitting free movement of the insulators 11 and 14. One portion 17 of the circuit of the relay 7 is connected to the line phase I.

Considering the line phase II, a bi-metallic spring 18 is secured to the insulation member 14 which is provided with a flexible lead 19 and line phase III includes a bi-metallic member or spring 21 attached to the insulator 11 and connected by a flexible connection 22 to the remainder of the system. It will be seen that the bi-metallic members 9, 21 and 13, 18 are connected in a cross-wise manner in pairs to the insulators 11 and 14 respectively and that springs 9 and 13 constitute a portion of line phase I while springs 18 and 21 are in series in line phases II and III respectively.

The circuit to the coil of the zero voltage magnet or relay 7 is formed in part by a lead 17 connected to line phase I and the remainder of the circuit comprises a line 23 connecting line phase II with one of a pair of resilient contacts 24 which are arranged in such relation that they may be bridged by a contact plate 26 secured to the leg of the T shaped insulator 14. A lead 28 connects the contacts 24 with one of a pair of resilient contacts 29 which are joined to lead 17 by a connection 31 to complete the relay circuit. A stop 27, the purpose of which will appear hereinafter is fixed directly above the insulator 14. The contacts 29 are adapted to be bridged by a contact plate 32, similar to plate 26 and arranged in a similar relation thereto.

A stop 33 is arranged adjacent to contacts 29 and plate 32 for limiting the movement thereof.

The full line positions of the several portions of the system show the positions taken by the motor switch 6 and the contacts 24 and 29 when current is flowing through all three phases, while the dotted line positions show the condition of the circuit when the phases are without current. The latter position of the switches is produced by the action of one of the bi-metallic members when the phase containing the same is without current. The time constant of the springs is made so small that the windings will be protected from damage.

Instead of using two bi-metallic strips 9 and 13 in line phase I, a single strip 34 may be used as is shown in Fig. 2, in which strips 36 and 37 are connected in line phases II and III respectively. The bi-metallic members 34, 36 and 37 are attached to a common three-legged switch member or spider 38 having a switch portion 39 connected thereto. The switch member 39 has a plurality of contact plates 41, 42, 43 and 44, joined in conducting relation, on which resilient contacts 46, 47, 48 and 49 are arranged in sliding relation. The degree of movement of the contacts 46, 47, 48 and 49 is limited by a stop member 51 which also aids in breaking contact between the plates or contacts upon tilting of the spider.

The circuit of relay 7 includes a lead 17 connected to line phase I, to the relay coil, a lead 31 from the relay coil to contact 49, contacts 48 and 47 and contact 46 to line phase II. It will be understood that connection is made between contacts 49, 48, 47 and 46 through contact plates 43, 41, 42 and 44 which are connected in conducting relation.

The positions of the several members shown in Fig. 2 indicates the circuit in closed condition, that is, all the phases are carrying current. When the switch is opened all the springs 34, 36, 37 will straighten out equally and member 38 will be moved upwardly without any rotation. The sliding contacts 46, 47, 48 and 49 will slide upon the contact plates 44, 42, 41 and 43 respectively whereby connection therebetween is broken. However, if a single phase is not supplied with current, the switch member 38 to which the bi-metallic springs 34, 36 and 37 are connected will be caused to assume an inclined position due to the fact that two of the springs will be under the influence of current passing through the respective phases while the other spring will be without such influence and, accordingly, will tend to straighten. Such tilting of the spider 38 will cause breaking of the contact between the sliding rods and the contacting plates carried by the switch member. The circuit to the relay 7 will accordingly be broken and the relay will operate to open the motor switch.

Although but two embodiments of the invention have been shown, it will be apparent that various changes may be made in the size, arrangement or form of the several members without departing from the spirit of the invention or from the scope of the appended claims.

The invention claimed is:

1. In a thermal relay for a circuit having a plurality of phases, a relay circuit and a control device therefor, and bi-metallic elements in series with two of said phases respectively for operating said device when an electrical condition in one of said two phases differs from an electrical condition in the other of said two phases and for preventing the operation of said device when said electrical condition changes to the same degree in each of said two phases.

2. In a thermal relay for a circuit having a plurality of phases, a relay circuit and a control device therefor, and bi-metallic elements in series with two of said phases respectively for operating said device when the magnitude of the current in one of said two phases differs from that of the current in the other of said two phases and for preventing the operation of said device when the magnitude of the current in each of said two phases changes to the same degree.

3. In a thermal relay for a circuit having a plurality of phases, a relay circuit and a control device therefor, and bi-metallic elements in series with two of said phases respectively for operating said device to open said relay circuit when the magnitude of the current in one of said two phases differs from that of the current in the other of said two phases and for operating said device to maintain said relay circuit closed by said device when the magnitude of the current in each of said two phases changes to the same degree.

4. In a thermal relay for a circuit having a plurality of phases, a relay circuit and control means therefor, said means comprising contact elements connected to said relay circuit, a tilting member having a contact member cooperating with said contact elements, and bi-metallic elements connected to said tilting member, said bi-metallic elements being responsive to changes of current to different degrees in different phases to open said relay circuit and responsive to changes of current to the same degree in different phases to maintain said circuit closed.

In testimony whereof I have hereunto subscribed my name this 14th day of November A. D. 1928.

PHILIPP SUTER.